INVENTORS
J. BERNUTZ
E. KLIVAR

BY O. O. Warner

ATTORNEY

United States Patent Office 3,523,262
Patented Aug. 4, 1970

3,523,262
RELAY ARRANGEMENTS WITH REED CONTACTS
Johannes Bernutz, Ludwigsburg-Hoheneck, and Erich Klivar, Ditzingen, Germany, assignors to International Standard Electric Corporation
Filed Dec. 15, 1967, Ser. No. 690,819
Claims priority, application Germany, Dec. 24, 1966, St 26,301
Int. Cl. H01h 67/00
U.S. Cl. 335—112                                    21 Claims

ABSTRACT OF THE DISCLOSURE

Relay strips are provided for telephone exchange systems. To form the relay strips, baked bodiless coils are fastened by apertures and/or studs or tongues to insulating strips. Reed contacts are then inserted into the coils to form a network of crosspoints. The baked coils and the reeds are held together and to the insulating strips by form-locking fittings of the individual parts.

---

The invention relates to an arrangement of relays with reed contacts, preferably coordinate-like through-connecting networks in telecommunication and particularly in telephone exchange systems.

For through-connecting networks or crossbar switches, respectively, the line inputs and the line outputs are arranged in different coordinates and the multiple lines form crosspoints which are through-connected by contact facilities.

In arrangements known of this type the individual contacting facilities (armature contacts) are associated with longitudinal coils in rows and columns which coils comprise all armature contacts of a row or of a column. By exciting a coil associated with a row and with a column, an armature contact as the crosspoint of these two coils is actuated. The number of contacts at each crosspoint generally corresponds to the number of lines (wires) to be through-connected. These longitudinal coils comprising always a row or column of several armature contacts are very expensive to manufacture and to mount; moreover, replacement of a longitudinal coil actuating only one crosspoint is impossible or is very difficult, because the contacts of several crosspoints, associated with the respective longitudinal coil are also concerned by such a coil replacement.

Furthermore, relays as plug-in type units are known in which several contacts are arranged in reed chambers, the terminal ends of which are led out on one side. This arrangement known requires a base and is therefore expensive. If both coordinates are wired with multiple lines they are very close together so that, if multiple lines of bare wire are used, difficulties arise for the single lateral lead-out of the terminals. Besides, these plug-in type arrangements known are very susceptible against vibrations when used in mobile stations.

It is also known to twist the terminal ends of the reed contacts prior to melting them into the sealed chamber, in order to connect the crossing multiple lines in two planes being perpendicular to each other. But this measure requires the use of a special construction of the reeds.

Furthermore, in quasi-electronic telephone exchange engineering based on the coordinate or crossbar principle switching grids with reed contacts are used which are arranged, in a way known per se by placing individual relay strips one above the other or side by side. Such a switching grid can be extended by adding further relay strips. The electrical connection of the reed contacts, arranged in a defined pattern, is made thus that e.g. the bottom contact lugs of the reeds are connected in multiple in the direction of the relay strips, while the top contact lugs in the nearly perpendicular direction, i.e. transverse to the relay strips, are frequently connected with a bare-wire multiple. Such an arrangement is demonstrated in the German printed application DAS 1,083,341. But with regard to space requirement and production costs this arrangement can still be improved.

It is the object of the invention to avoid the disadvantages of the constructions known to the art and to provide a relay strip, cheap in costs and of a compact construction, considering automatic production. This is achieved according to the invention that the exciting coils having the shape of baked coils without coil body are fixed by apertures and/or studs or flaps of plate-shaped insulating material, capable of being punched, spray-molded or pressed and the arrangement of the baked coils and the reed contacts arranged within said coils is made by a form-locking fitting of these individual parts of the relay strip.

A relay strip constructed in accordance with the invention possesses various advantages. For example, it requires less space than a comparable known relay strip having the same number of reed contacts. Because the strips are open in the longitudinal direction for the cooling air a very compact arrangement of the switching grid is possible. Manufactured automatically for which production the relay strip according to hte invention is provided a particularly cost-saving arrangement of switching grids is possible.

The invention is described with the aid of drawings, wherein.

Figure 1:
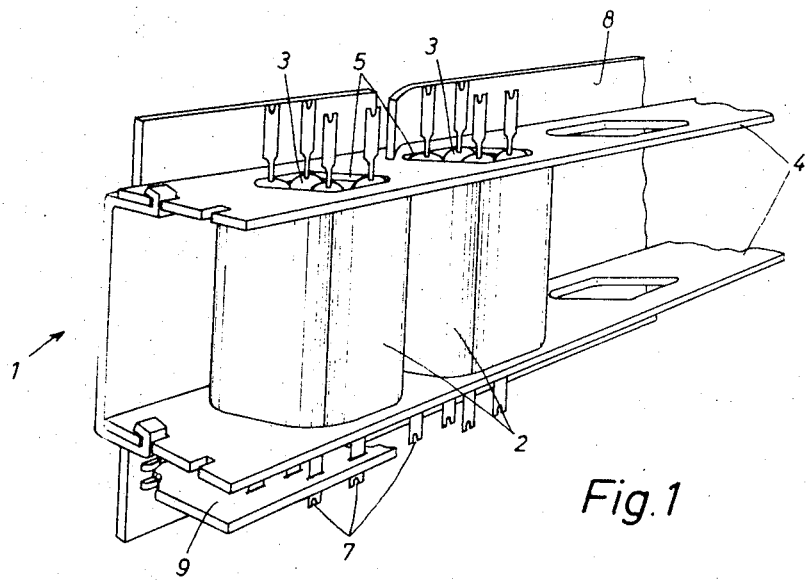
FIG. 1 shows a relay strip in a perspective view.
Figure 2:
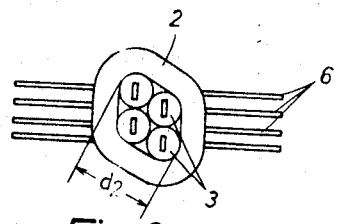
FIG. 2 shows the arrangement of the coils with the therein included reed contacts of a relay strip, seen from top.

FIG. 1 shows the construction of a relay strip 1 in which baked coils 2, each comprising four reed contacts 3 are borne between two insulating material strips 4. The aperatures 5 in the strips 4 keep the reed contacts 3 in the arrangement shown in FIG. 2, so that bare-wiring shown at 6 may traverse the relay strip 1. As an internal wiring along the strip 1 a suitably shaped bare-wire multiple or an additional plate 9 with printed circuits is connected to the lower terminal lugs 7. Both insulating material strips 4 are connected to a unit by a shielding sheet 8 for the magnetic coupling of the reed contacts 3.

Figure 3:
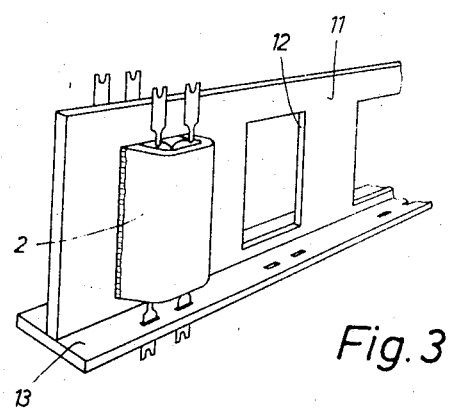
FIG. 3 shows another construction of a relay strip in a perspective view.
Figure 4:
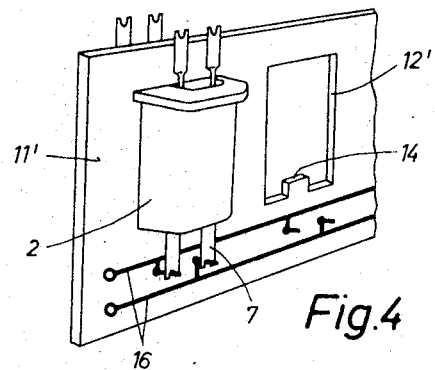
FIG. 4 shows another example of a relay strip in a perspective view.
Figure 5A:
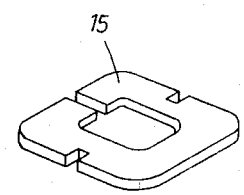
FIG. 5a to 5c show details of the relay strip according to FIG. 4.

In the construction shown in FIG. 3 a strip 11, located in the plane of the coil axis, connects the individual relay coils 2. The coils 2 are, e.g., glued into the apertures 12 of the strip 11. A second insulating strip, made as printed circuit plate 13, on the bottom side of the relay strip comprises the multiple in the direction of said strip. In the relay strip according to FIG. 4 the second insulating material strip has been omitted and the multiple connection 16 is fixed directly at both sides of the vertical supporting strip 11'. The apertures 12' to accommodate the coils 2 have studs 14 at the bottom for engaging the coils 2. By inserting a disk 15 (FIG. 5a) or of a strip at the top end of the coil an additional guidance of the reed contacts is achieved.

Figure 5B:
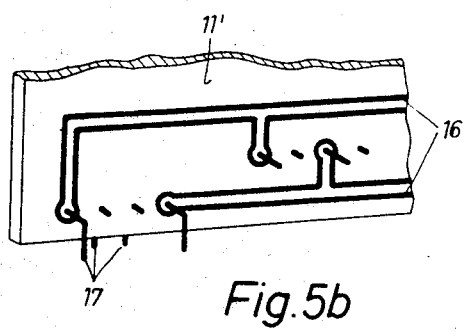
Figure 5C:
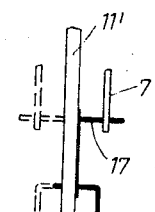

The multiple 16, formed, for example, as a printed circut, is connected with the bottom terminal lugs e.g. 7 of the reed contacts by the pins 17, inserted into the strip 11' (FIGS. 5b and 5c).

Figure 6A:
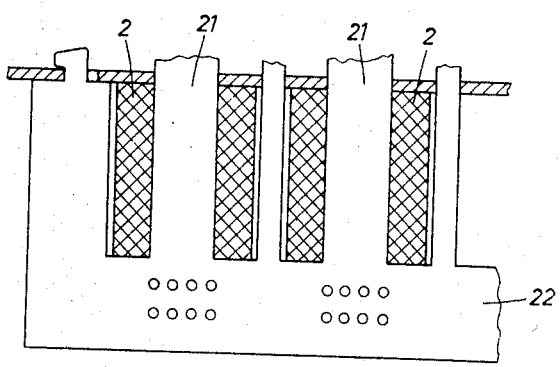
FIG. 6a and FIG. 6b show another construction of a relay strip, in a top view and in elevation, and partly in section.
Figure 6B:
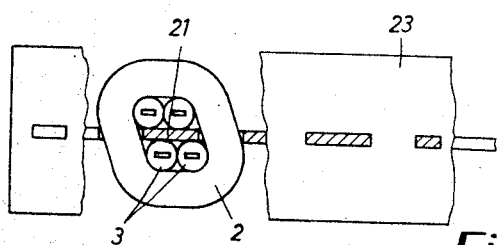
Figure 7A:
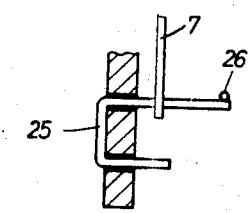
FIGS. 7a–7d show details of a multiple connected to the strip.
Figures 7B, 7C, 7D:
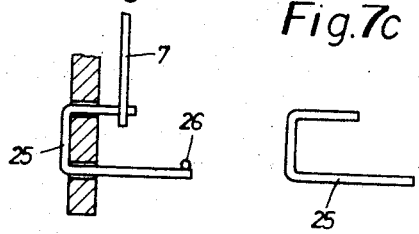

Compared to the constructions according to FIGS. 1 to 5, the shape shown in FIGS. 6a and 6b shows the advantage that the baked coils 2 can be plugged from the top onto the tongues 21 of the strip 22. This construction is particularly suitable for automatic production. The coils 2 are kept in their position by a second, top-mounted fixing strip 23. Due to the play of the reed contacts 3 in the coils 2 it may occur that the bare wires passing through the top contacting lugs touch each other. Therefore cuttings are provided at the top end of the tongues 21 of the strip 22 which keep the bare wires at defined distances.

FIGS. 7a through 7d show several views of another arrangement of the multiple at the bottom end of the strip 21', 22. In always two drillholes 24 of the strip 21', 22 inserted wire clamps 25 carry the bottom lugs 7 of the reed contacts. The multiple connection of the equivalent reed contacts on either side of the strip 11', 22 is closed by two bare wires 26, soldered in two planes.

Figure 8A:
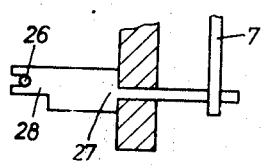
FIGS. 8a and 8b show another construction of a multiple on a strip.
Figure 8B:
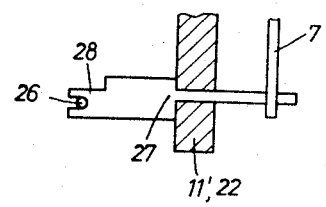

In FIGS. 8a and 8b punched-out soldering lugs 27 are used instead of the wire clamps 25. The asymmetrical end 28 of the lugs 27 permits an arrangement of the bare wires 26 in two planes.

Figure 9:
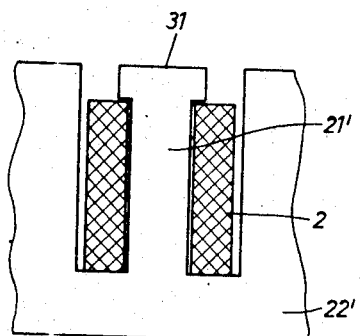
FIGS. 9 to 14 show different constructions of the strip to fix the coils.
Figure 10:
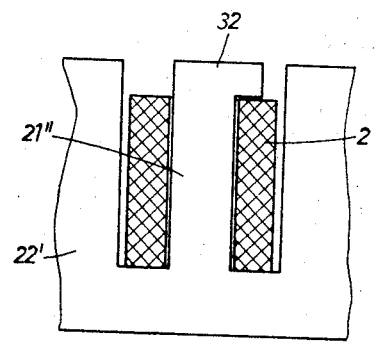

FIGS. 9 and 10 show a construction of the strip 22' in which the coils 2 are fixed to the tongues 21' and 21" by a T-shaped or L-shaped stud 31 or 32. A coil 2 can be plugged over this end with its maximum width ($d_2$ in FIG. 2) and is fixed after turning it by approximately 45° by the inserting reed contacts. In the installed position with width of the coil is small so that the coil 2 is kept in place by the T-shaped or L-shaped stud 31 or 32.

Figures 11A, 11B:
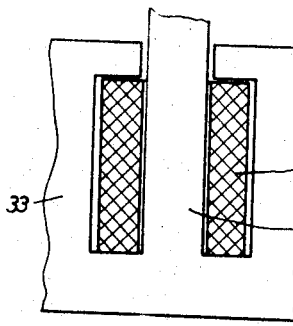
Figure 12:
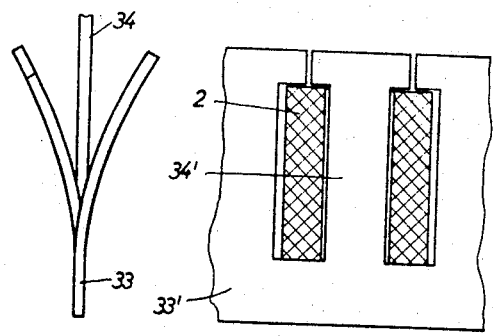

The shapes of the supporting strip 33 or 33', shown in FIGS. 11a, 11b and 12, achieve a still better form-locking fixing of the coils 2. The tongue 34 or 34' to hold the coil 2 must be bent out resiliently from the strip 33 or 33' as shown on the drawing. After sliding on the coil 2 the tongue plate 34 or 34' resiliently moves back into its original position so that the coil 2 is safely encroached.

Figure 13:
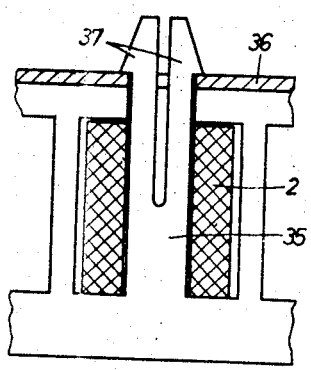
Figure 14:
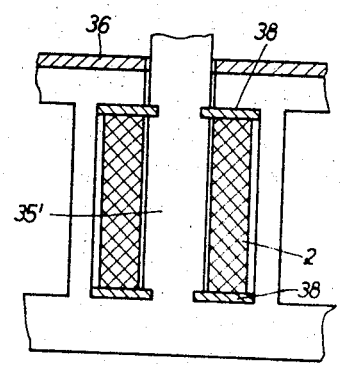
Figure 15:
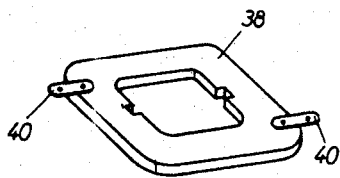
FIGS. 15 to 17 show details of the construction according to FIG. 14.
Figure 16:
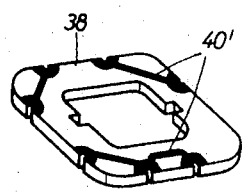
Figure 17:
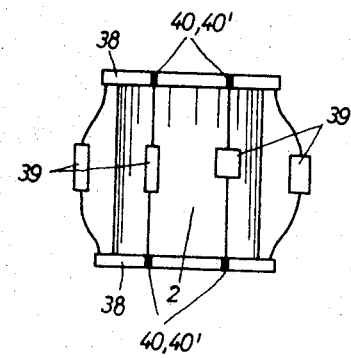

The FIGS. 13 and 14 show two examples in which an evasion of the tongue 35 or 35' from its centre position is prevented by a thereto mounted strip 36. In FIG. 13 said strip 36 is kept in place by two resilient hooks 37 of the tongue plate end. In FIG. 14 additional coil flanges 38 are provided at both coil ends which may carry soldering lugs 40 or printed circuits 40' for soldering components 39 thereto (FIGS. 15 to 17).

Figure 18:
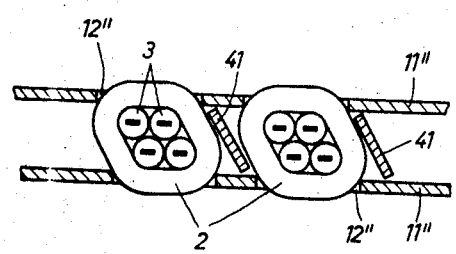
FIG. 18 shows another construction of a relay strip, viewed from the top.

FIG. 18 shows fixing of the coils 2 between two supporting strips 11" provided with apertures 12". This arrangement permits a very close proximity of the reed contacts 3. Insulating pieces 41, inserted between the adjacent coils 2 prevent twisting of said coils 2 at their flat sides.

Figure 19A:
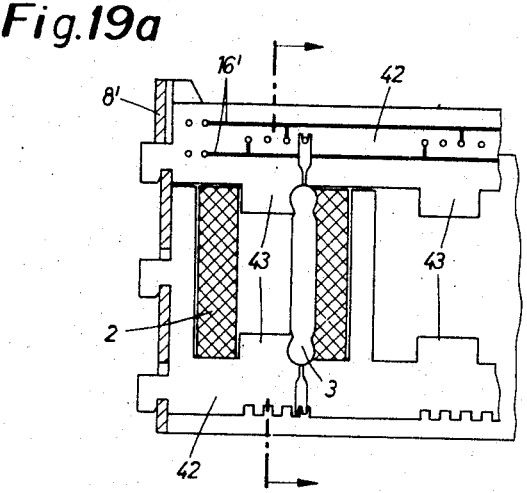
FIGS. 19a through 19c show another construction of a relay strip in elevation, top view and in section.
Figure 19B:
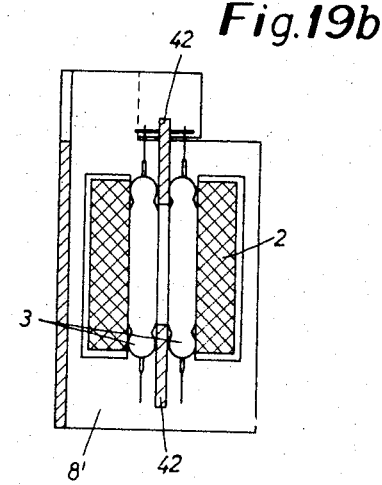
Figure 19C:
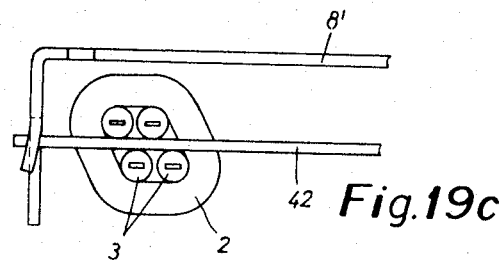

A construction in which two small supporting strips 42 engage with their studs 43 into the coil ends is shown in FIGS. 19a to 19c. The top small strip 42 carries the multiple 16', either in bare-wiring or in printed circuitry. The small strips 42 are kept together by cuttings off the shielding metal sheet 8'.

Figure 20A:
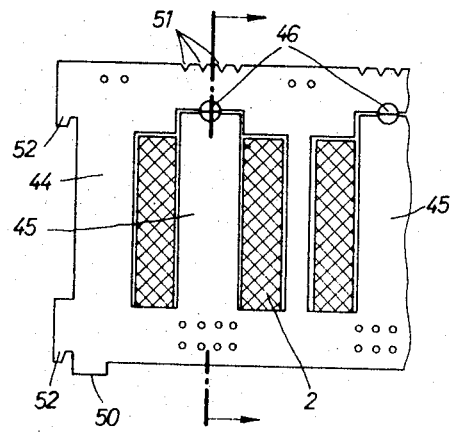
FIGS. 20a and 20b show another construction of a strip in elevation and in section.
Figure 20B:
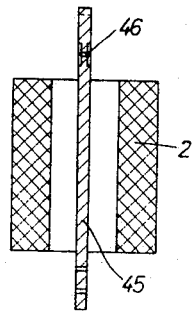
Figure 21:
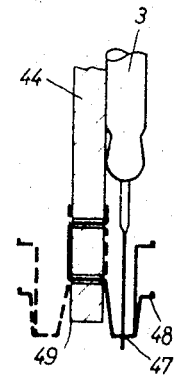
FIG. 21 shows a detail of a strip according to FIGS. 20a and 20b, in section.

The construction shown in FIGS. 20a and 20b possesses the advantage of higher rigidity against bending of the supporting strip 44 compared to the comb-like slotted strips 22, 33 of the FIGS. 6 and 9 to 14. Prior to inserting the coil 2 the tongue 45 must again be pressed aside resiliently. After said tongue has returned into its original position it may be kept in place either by pressing together or by a separate rivetting part at the separating joint 46 of the tongue's end against further bending. This prevents an excessive stress on the soldering lugs due to vibrations in mobile systems. In order to ease dip soldering of the lower terminal lugs 47 the bottom end of the wire clamp 48 projects beyond the insulating edge 49. Projections 50 at the end of the supporting strip 44 protect said projecting clamp ends against damage when placing the strip towards a surface. By fanning out of the wire clamp ends a multiple connection with bare wire is possible in two planes. The top edge of the supporting strip 44 has cuttings which keep the bare wires of the outside wiring at a distance thus preventing mutual touching. The supporting strip 44 is hooked into slots of the shielding metal sheet with the aid of hook-shaped studs 52.

Figure 22A:
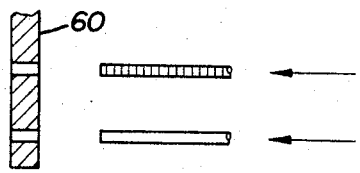
FIGS. 22a to 22e show different manufacturing processes of the bare-wire multiple.
Figure 22B:
Figure 22C:
Figure 22D:
Figure 22E:
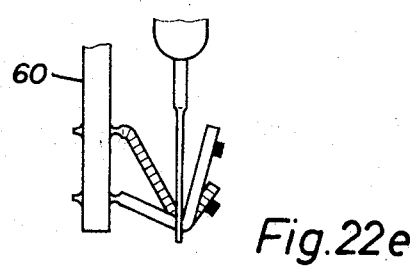

FIGS. 22a to 22e show a simplified process for production of the bare wire multiple for a relay strip as it may be manufactured automatically. The five working steps shown from FIG. 22a to FIG. 22e are taken from one side of the strip. Typically, ten coils (not shown) or twenty wire pins (from stock coils) are simultaneously applied to the perforated strip 60. The pins are embossed as shown in FIG. 22b, in such a way that the edge of the embossing on the pin end is at the same time a bending point. After bending, the multiple wires are point-welded at 62 and 63 in FIG. 22c. Thereupon the pins are bent upward under different angles, as shown in FIG. 22d, in order to keep a proper separation. If both strip sides are prepared in this way the inserted reed contacts can be dip-soldered simultaneously as indicated in FIG. 22e.

While the principles of the invention have been described above in connecttion with specific apparauts and applications, it is to be understood that this description is made only by way of example and not as a limitation on the scope of the invention.

What is claimed is:

1. A relay strip providing crosspoints for a telecommunication network comprising a plurality of insulating supports in the form of thin strips of insulating material, a plurality of apertures in the thin strips, exciting coils in the shape of baked coils without coil bodies, means mechanically interconnecting the exciting coils and the insulating supports in alignment with said apertures, a plurality of reed contacts, and means including form-locking fittings for holding said reed contacts in position within said exciting coils.

2. A relay strip according to claim 1, in which exciting coils are positioned between two insulating supports.

3. A relay strip according to claim 2, in which two insulating supports are arranged in planes passing through ends of the coils.

4. A relay strip according to claim 1, in which two insulating supports are arranged in parallel to a plane through an axis of an exciting coil on either side of the exciting coil and insulating pieces and are inserted between the supporting strips and the exciting coils to prevent twisting of said coils.

5. A relay strip according to claim 2, in which insulating supports, arranged in the plane of the coil axis, engage the coil ends with studs.

6. A relay strip according to claim 1, in which the exciting coils are supported by a single supporting strip, arranged in the plane of the coil axis.

7. A relay strip according to claim 6, in which the reed contacts, arranged within the exciting coils are additionally fastened at a coil end by a disk.

8. A relay strip according to claim 7, in which said means for supporting exciting coils includes tongues over which the exciting coils are slid.

9. A relay strip according to claim 8, in which tongues of a supporting strip include a shaped stud to fix the inserted coils.

10. A relay strip according to claim 8, in which tongues for plugging the baked coils can be resiliently bent out of the supporting strip and return into their original position resiliently after the coils have been slid onto them.

11. A relay strip according to claim 8, in which resilient tongues are prevented against deviation from a center position by an inserted strip.

12. A relay strip according to claim 11, in which the strip is kept in place by resilient hooks of the tongue ends.

13. A relay strip according to claim 8, in which the resilient tongues are safeguarded against a further bending out by a separate rivet portion at a separating joint of the tongue end.

14. A relay strip according to claim 1, in which the supporting strips are collected with a shielding metal sheet serving to connect the reed contacts with the aid of cuttings, studs, and the like.

15. A relay strip according to claim 1, in which multiple wiring is made either in the known way of bare-wiring or a separate, printed circuit plate is used.

16. A relay strip according to claim 15, in which the multiple is directly applied as printed conductors on the supporting strips to carry the excited coils.

17. A relay strip according to claim 1, in which insulating supports in the form of coil flanges are inserted into the supporting strip at the coil ends of the coils, said flanges bearing means to which soldering components may be attached.

18. A relay strip according to claim 15, in which wire clamps, inserted in two holes of the supporting strip, carry the bottom soldering lugs of the reed contacts.

19. A relay strip according to claim 14, in which soldering eyes, inserted into the holes of the supporting strips, carry the bottom terminal lugs of the reed contacts.

20. A relay strip according to claim 15, in which the supporting strip includes cuttings to hold and to guide bare wires in the proximity of the ends of the reed contacts.

21. A relay strip according to claim 20, in which the terminal lugs of the reed contacts are shorter than the exterior edges of the supporting strip and are thus protected against damage.

References Cited

UNITED STATES PATENTS

| | | |
|---|---|---|
| 2,947,965 | 8/1960 | Scoville. |
| 3,188,423 | 6/1965 | Glenner. |
| 3,293,502 | 12/1966 | Beierle _____ 335—152 |
| 3,293,578 | 12/1966 | Else _____ 335—152 |
| 3,302,143 | 1/1967 | Harkenrider _____ 335—202 |
| 3,340,436 | 9/1967 | Jones. |
| 3,386,056 | 5/1968 | Frydman _____ 335—112 |

BERNARD A. GILHEANY, Primary Examiner

HAROLD BROOME, Assistant Examiner